ial gravity settling basin G for the pur-
UNITED STATES PATENT OFFICE.

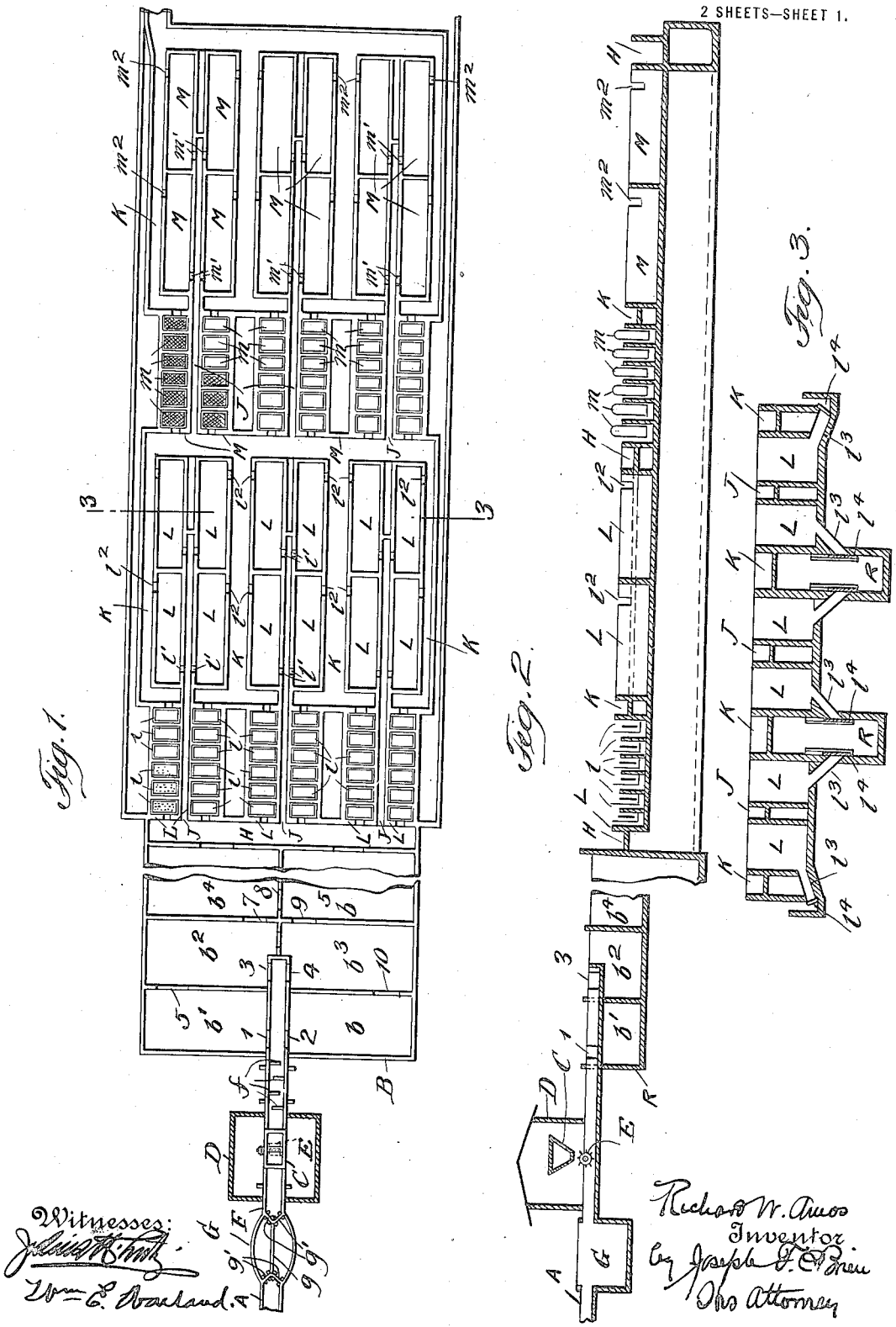

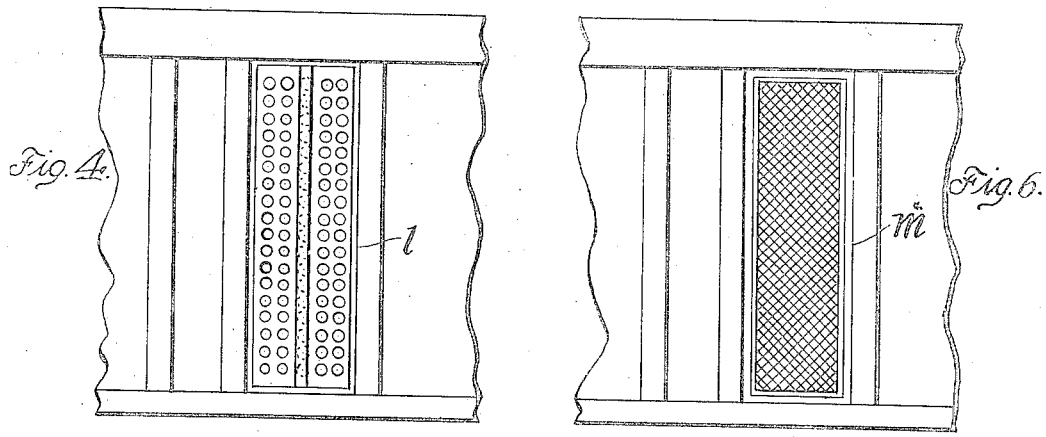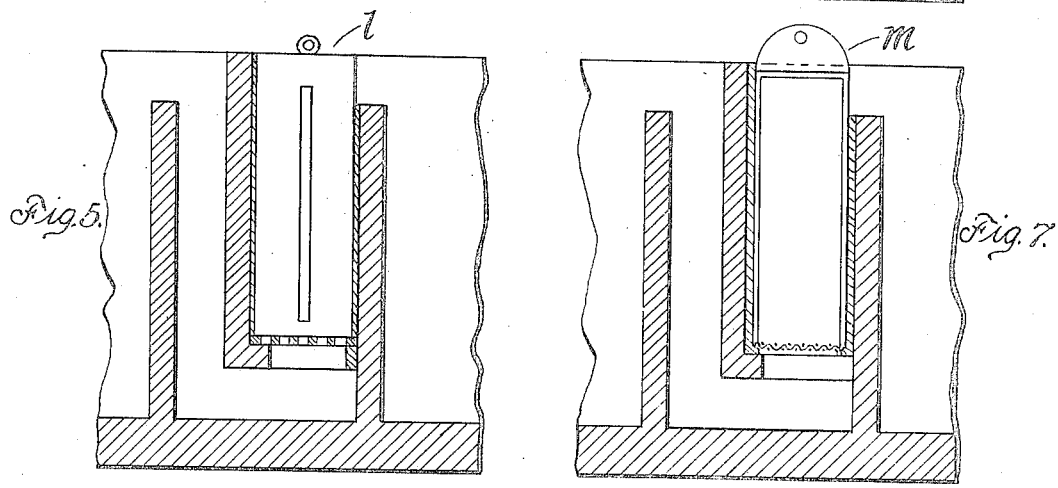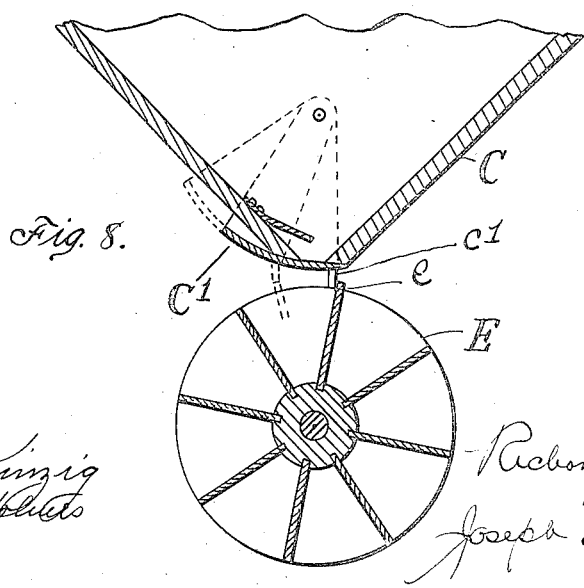

RICHARD W. AMOS, OF BROOKLYN, NEW YORK, ASSIGNOR TO NATIONAL PURIFICATION COMPANY, A CORPORATION OF NEW YORK.

SEWAGE-FILTERING SYSTEM.

1,165,741.   Specification of Letters Patent.   Patented Dec. 28, 1915.

Application filed January 25, 1911. Serial No. 604,619.

*To all whom it may concern:*

Be it known that I, RICHARD W. AMOS, a citizen of the United States, and a resident of Brooklyn, in the county of Kings and State of New York, have invented certain new and useful Improvements in Sewage-Filtering Systems, of which the following is a specification.

My invention relates to improvements in sewage filtering systems.

By the use of my invention I provide a system adapted for the treatment of large quantities of sewage such as come from towns, cities, etc., which possesses great elasticity or capability of being extended indefinitely without reconstruction of the original plant; and is exceptionally compact, occupying the smallest possible land area for a given amount of sewage effectively purified.

In the accompanying drawings, in which Figure 1 illustrates a plan view of my preferred form of apparatus; Fig. 2, a section on a line running longitudinally through the center of the plant; Fig. 3 illustrates a transverse section on the line 3—3 of Fig. 1; Figs. 4, 5, 6 and 7 illustrate enlarged detail views of the filter boxes employed, and Fig. 8 illustrates an enlarged detail of the mixing wheel, hopper and accompanying parts.

Referring now to these drawings, A designates a sewer pipe or discharge pipe in the sewer mains.

B designates what I shall term a "chemical settling tank" which I will hereinafter describe. Before the sewage enters this settling tank, I prefer to subject it to a preliminary treatment.

C designates a hopper arranged at a suitable point in any suitable housing or building D, into which, when the system is in operation, will be poured suitable chemicals, preferably in powdered form.

In the drawings, Figs. 2 and 8 I have shown arranged beneath the hopper what may be called a "mixing wheel" E, comprising a series of plates arranged on a hub and preferably projecting a greater or less distance into the sewage passage.

C' designates a valve of any suitable character for controlling the opening in the bottom of the hopper.

The mixing wheel E is preferably driven by the flow of the sewage and churns the chemical dropped on it into the sewage as it flows along.

F designates a sewage passage for conveying the sewage past the chemical hopper. This passage will be hereinafter referred to as the "main sewage canal."

The sewage pipe A may be directly connected to this main sewage canal F, but I prefer to arrange intermediate the sewage pipe and the main sewage passage an initial gravity settling basin G for the purpose of permitting sand and other heavy substances to be precipitated and eliminated. The basin G is provided with partition $g$, to divide the same into two compartments, each of the same being controlled by gates $g'$, $g'$, $g'$, $g'$. These gates permit of the temporary closing of either one of the compartments for the purpose of cleaning out the same while the sewage flows through the other compartment, the gates of which are open.

Before filtering the sewage I preferably lead the sewage through a plurality of settling tanks and compel the same to flow from the main sewage canal F into and through the settling tanks in such a manner that the sewage will traverse the longest possible path, will be distributed evenly to said settling tanks, and will be delivered to the cross-channel H and to the supply channels J of the succeeding filtering apparatuses connected with said cross-channel H in approximately equal quantities.

In Fig. 1, I have illustrated a settling tank having six compartments $b$, $b'$, $b^2$, $b^3$, $b^4$, $b^5$. As the sewage comes through the main canal into the filtering tank, a portion thereof will pass out through the apertures 1 and 2 into the compartments $b$ and $b'$. Some will pass from the apertures 3 and 4 into the compartments $b^2$ and $b^3$. That portion which passes into the compartment $b'$ will then pass through the holes 5 and 7 into the compartments $b^2$ and $b^4$ respectively.

That portion of the sewage which passes through the holes 2 into the compartment $b$ will pass through the opening 10 into the compartment $b^3$ and thence through the openings 9 into the compartments $b^5$.

In the subsequent treatment of the sewage, I direct the sewage in any suitable manner to the underside of the filter, and under sufficient pressure to force the same up through the filter and then onward. The necessary pressure is preferably supplied by gravity, or in other words, by arranging the filters on a gradual incline.

In the preferred form of apparatus illustrated, I have shown a series of three pairs of electrical apparatuses and three pairs of ordinary filtering apparatuses.

Wherever a series of filters are used, the sewage as it comes up through the top of each, will be prevented from flowing over into the top of the next by the use of what might be called baffle plates or partitions,— the rear partition or wall of each filter box being considerably higher than the forward wall. The sewage may thus be handled rapidly and in an economical space, and I have found the most economical arrangement to be where as illustrated a series of filter compartments is arranged one after the other, and each series of boxes being arranged in pairs, and each pair divided by a sewage canal which not only feeds the members of that pair but also one or more succeeding pairs, and these pairs preferably drain into a common clear water canal, such as K. By this arrangement, I can readily extend each filter sewage canal. Thus, when the first filter compartment has received all the sewage it can conveniently handle without crowding or choking, the oncoming sewage continues along the canal and may be admitted to the next compartment and so on.

In both the ordinary and electrical filtering parts of my system, it is necessary of course, that what I shall call the "clear water," by which is meant water which has passed through a filtering compartment, shall always be kept away from the possibility of contact with either, first, any of the oncoming sewage, and second, with any of the matter which has been removed and deposited, and for the sake of economy of space and greater convenience, it is important that all the clear water from each of the successive compartments should be led into one canal or channel and that contiguous pairs of compartments drain into a single canal or channel and finally into one transverse canal, where it is re-distributed to the various succeeding filtering apparatuses.

On each side of the filter sewage canal are arranged a series of filter boxes separated from each other.

As illustrated, each of the electrical and ordinary filtering compartments L and M are divided into a series of sub-compartments, in each of which sub-compartments is located a filter box $l$ or $m$ so located within the sub-compartments as to leave an L-shaped channel to conduct the sewage downwardly and horizontally and then upwardly through the filter boxes $l$ or $m$, as the case may be, then into the next downwardly and horizontal channel and so on to each succeeding box. Each of the ordinary filter boxes will be provided with suitable filtering beds or filtering agents to filter the sewage as it passes through such boxes. Such ordinary filtering boxes will of course be provided with suitable inlets and outlets controlled by suitable gates, and the box will preferably be removably retained in position in the compartments.

The electrical filtering apparatuses employed by me preferably also consist of a plurality of compartments similar in shape and arranged in the same manner as the ordinary filters, each being provided with an inlet and an outlet controlled by suitable gates and each containing a series of removable boxes or cells having an electric filter, the sewage being led first through one type of the filter and then through the other.

The electrical box or cell preferably employed contains a horizontally disposed electrode comprising a perforated metallic plate which preferably forms the bottom of the box, and a vertically disposed electrode centrally located within such box, and these electrodes are connected up in a suitable electric circuit.

The sewage is fed in an upward direction through each of the horizontally disposed perforated electrodes successively and into contact with each of the centrally located, vertically disposed electrodes. In this electrical apparatus, the sewage receives a series of electrical shocks each of which is of extended duration. Thus, even before the continuously flowing sewage reaches the horizontally disposed electrode it enters the field and the charge then received assists in precipitating certain substances before entering the cell. The sewage then receives a further continuous charge as it passes up through the perforated plate into the cell and into contact with the vertically disposed plate. In this way, the field of the electrical charge is broadened and a more complete sterilization and precipitation of deleterious substances results. In Figs. 4 and 5, I have shown enlarged views of these electrical filter boxes.

As shown, (Fig. 3), I also provide a channel or conduit R beneath both the ordinary and electrical filter boxes hereinafter called a "sludge channel" for receiving the material precipitated by the various filters, each of the filter boxes and compartments being provided with one or more pipes $l^3$ leading from the bottom thereof to this sludge conduit. Each of these sludge discharge pipes is preferably provided with suitable gate valves, such as $l^4$.

It will be seen furthermore that by my invention I produce a unitary system in which one or more entire compartments or tanks may be shut off for cleaning or other purposes and any number of filters or tanks in a compartment may likewise be shut off or removed.

The sludge conduits lead to a suitable sludge reservoir (not shown) preferably located at the rear of the plant.

Having described my invention, I claim:

1. In a sewage filtering system, the combination with a sewage supply channel of compartments on each side thereof, each compartment containing a series of filter boxes and a clear water channel on each side of such compartments.

2. In a sewage filtering system, the combination with two pairs of sewage compartments, each compartment provided with a suitable filter box, a sewage supply channel located between each pair of compartments and a centrally located clear water channel between the opposing pairs adapted to drain the compartments on each side thereof.

In witness whereof, I have signed my name to the foregoing specification in the presence of two subscribing witnesses.

RICHARD W. AMOS.

Witnesses:
ALFRED B. DENT,
JAS. L. SKIDMORE.